United States Patent Office 3,323,904
Patented June 6, 1967

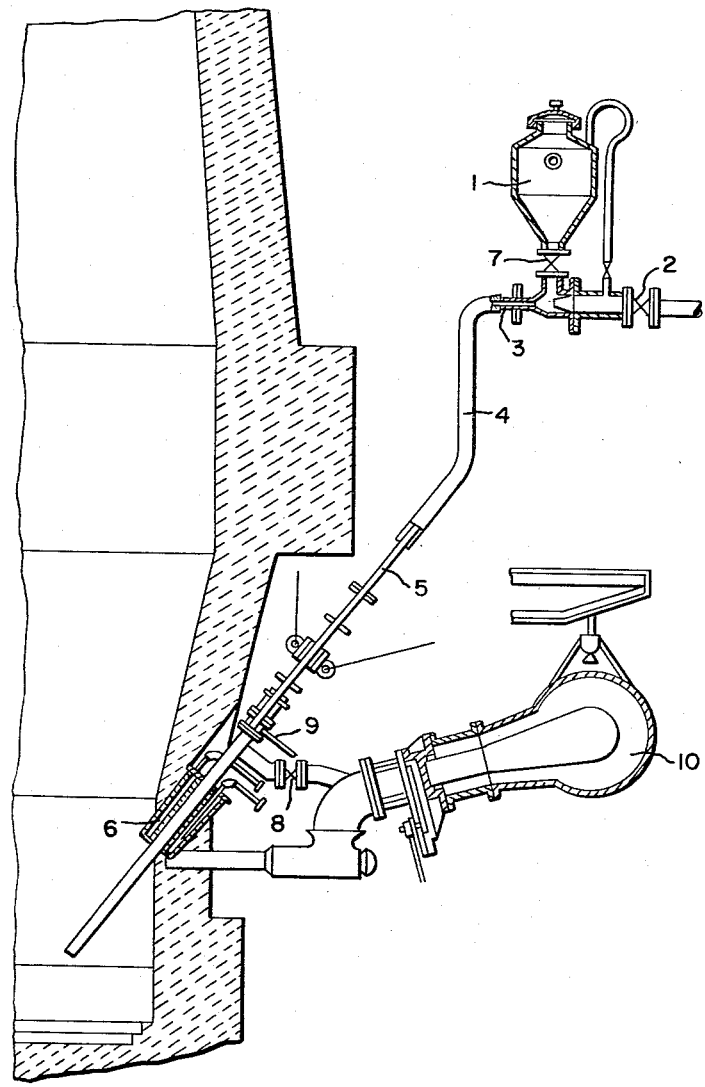

3,323,904
METHOD OF OPERATING A BLAST FURNACE
Koretaka Kodama, Akitoshi Shigemi, and Toshimitsu Ogata, Kitakyushu, Japan, assignors to Yawata Iron & Steel Company Ltd., Tokyo, Japan, a Japanese company
Filed Oct. 7, 1963, Ser. No. 314,338
3 Claims. (Cl. 75—31)

This invention relates to a method of operating a blast furnace in which titanium-containing iron ore, especially iron sand ore, is mixed with ordinary ore.

Iron ore which is high, e.g. on the order of 8%, in titanium content, such as iron sand ore, is found in large deposits and is so cheap that processes of smelting it have been sought for a long time in various fields, such as producing iron by an electric furnace smelting process and direct reduction processes. These processes can be practiced on an industrial scale and some of them have already been practiced. However, they are limited in that they can be practiced only on a small scale and in districts where electric power is very cheap.

According to research by E. F. Cone, J. A. Heskett and Kumahiko Hasegawa, if a large amount of iron sand ore is used in a blast furnace, titanium-containing pig iron or slag will coagulate immediately in the hearth and will reduce the furnace capacity, and will therefore cause such troubles as making the molten pig iron flow out through the slag notch and making the slag flow out through the tuyere. This makes the operation of the furnace difficult. According to Kumahiko Hasewaga, the cause of the coagulation in this location is presumed to be that a part of the $TiO_2$ will be reduced to such unstable lower oxides as $Ti_2O_3$ and $TiO$ within the furnace, and another part of the $TiO_2$ will become a ferrotitanium having a high melting point which will enter the slag or molten pig iron and elevate its melting point and make it coagulate in the furnace bottom. Further research on this problem in which iron sand ore is used in a test blast furnace of a capacity of 5.1 cubic meters, has confirmed the theory that if a large amount of iron sand ore is used, iron especially high in titanium content will be produced in part of the furnace. However, it will not be discharged from the furnace at the time of tapping but will remain in the furnace, and it will thus reduce the effective capacity of the furnace part and will cause various troubles. Thus, the use of iron sand ore in a blast furnace as a material for making pig iron has been generally limited to such a small amount as below 80 to 100 kg. iron sand ore per ton pig iron. In the trials of the use of iron sand ore in much greater amounts in a blast furnace it has been found that if, before tapping, powdered iron ore is blown into the molten pig iron together with high pressure air so as to oxidize and remove the titanium in the molten pig iron, no iron which is high in titanium content will remain in the furnace and the blast furnace will be able to be favorably operated. However, with such a method, when the iron ore is blown into the molten pig iron before tapping, the temperature of the molten pig iron will be reduced and the amount of sulphur in the molten pig iron will tend to increase. Further, because the iron pipe through which powdered iron ore is blown into the furnace will melt and break off in the furnace, it is difficult to positively blow the powdered iron ore into the molten pig iron, and the furnace bottom tends to be damaged.

It is an object of the present invention to provide a solution to the above mentioned defects and provide a method of operating a blast furnace, while using iron sand ore mixed with iron ore used in an ordinary blast furnace at a high mixing rate of about 50% of the total charge.

Another object of the present invention is to provide a method of operating a blast furnace wherein a solid oxidizing agent is blown through an ordinary tuyere, an inclined tuyere or slag notch under high pressure into the blast furnace so that the coagulated iron high in titanium which has been deposited on the furnace wall may be oxidized and removed.

Other objects of the present invention will be made clear by the following description and the accompanying drawing, in which the figure is a schematic representation of a part of a blast furnace used in the method according to the present invention.

The method of operating a blast furnace according to the present invention comprises blowing into the blast furnace, in which raw material prepared by mixing about 50% sintered iron sand ore with other iron-making material low in titanium content, such as ordinary sintered ore, Tambun ore, Itabirite, is being smelted, a powdery solid oxidizing agent, for instance, powdered iron ore, converter sludge, open-hearth furnace sludge or powdered manganese ore, together with a compressed oxygen containing gas to oxidize the coagulation deposited on the wall of the furnace and to remove the oxide formed thereby.

The blowing of a powdery solid oxidizing agent is to be carried out immediately after tapping or at any time before tapping.

As well known, in a blast furnace which comprises top, stack, bosh and hearth a reduced molten iron is collected in the bottom of the hearth from which it is tapped at regular intervals and a molten slag layer is formed on the molten iron layer.

With the progress of the smelting of iron ores during the operation of blast furnace there is formed naturally a space between the lower part of the bosh occupied by the coke layer and the molten slag layer on the molten iron layer in the hearth, and the newly molten iron drops through said coke layer and said space on to said molten slag layer. This space will be the largest when tapping is finished and the smallest at the time just before tapping.

The method according to the present invention is characterized by the fact that said powdered oxidizing agent is not immediately blown into the molter slag layer or molten iron layer but into said space, more concretely, into an intermediate zone between the molten slag layer and the level of the tuyere when blowing the same before tapping and into the bosh and the hearth when blowing immediately after tapping. By blowing an oxygen containing agent as above mentioned, there will be little likelihood that the temperature of the molten steel will be reduced and the sulphur in the pig iron will increase but little. Since there is no necessity for making the blowing position constant, the blowing step can be carried out simply. Further, since the oxidizing agent is blown in at a position considerably above the furnace bottom, there is little danger of breaking the furnace bottom. However, it is more effective to blow a powdery solid oxidizing agent immediately after tapping than before tapping, because, immediately after tapping has been carried out, the area of the furnace wall, upon which the blown oxidizing agent may act is large, there remains no molten slag and molten pig iron in the hearth which would prevent the contact of the oxidizing agent and the coagulation and moreover the blown oxidizing agent will remain in the hearth and will be thereby effective up to the next tapping.

When a powdery solid oxidizing agent is thus blown into the furnace, titanium contained in the coagulation deposited on the furnace wall, which is present in the form of metallic titanium, will be reoxidized by the blown oxidizing agent to form $TiO_2$ and the latter is peeled off in a fuzed state from the furnace wall and falls into the hearth bottom or into the molten slag layer and then removed together with the molten slag.

Therefore, even if a large amount of iron sand ore is used in the blast furnace charge, the furnace can be operated favorably and without any trouble caused by the use of this type of ore.

When blowing an oxidizing agent a great part thereof will react with the coagulation deposited upon the furnace wall, but a part thereof will be utilized to react with titanium and silicon contained in the molten iron dropping through the coke layer in the bosh to oxide them, so that titanium and silicon also contained in the molten iron may be removed.

A gaseous agent used as a medium for blowing a powdery solid oxidizing agent can be one of many such agents. However, an oxidizing gas such as air and oxygen gas is preferable. On the other hand, a gaseous agent alone is not effective as an oxidizing agent. The use of the powdered solid agent is absolutely necessary, because a gaseous agent will not stay long enough in the bosh and hearth, and an effective contact with the coagulation on the furnace wall cannot be achieved.

An oxidizing agent may be blown into the furnace through a tuyere, slag notch, or an especially arranged inclined tuyere according to the extent of the space formed between the lower part of the bosh and the surface of the molten slag layer or between the lower part of the bosh and the hearth bottom by using a lance inserted therethrough. The blowing may also be either continuous or intermittent.

An example of an apparatus for carrying out the present invention is shown in the drawing. A tank 1 contains one or more kinds of solid oxidizing agents having grains of a size of, for example, 1 to 10 mm., preferably below 3 mm., such as powdered iron ore, converter sludge, open-hearth furnace sludge, and powdered manganese ore. After the amount of powdered oxidizing agent required is placed in the tank 1, it is sealed. Then a high pressure air valve 2 is opened to admit high pressure air at a pressure, for example, of 3 kg./cm.², through an iron pipe 3, a rubber hose 4 and a lance 5. The pressure of air to be blown is, however, not limited to 3 kg./cm.². A suitable pressure may be selected in compliance with the capacity of the blast furnace. For instance, in using a blast furnace of the capacity of 600 t./d. a pressure of 6 to 10 kg./cm.² may be applied. A lance 5 is inserted into any required position within the furnace through an inclined tuyere 6. Then, a valve 7 below the tank 1 is opened and the powdered iron ore is fed into and mixed with the high pressure air flowing into the furnace through the pipe 3, hose 4 and lance 5. The inclined tuyere 6 is a water-cooled type and slants downwardly towards the center of the hearth. This tuyere is normally opened to blow the oxidizing agent therethrough. A hot air valve 8 which is normally closed, is arranged on the pipe connecting the inclined tuyere 6 and the blower 10 to regulate the temperature of the tuyere by opening the valve 8 to supply the heat from the blower 10, if necessary to elevate the temperature of the tuyere. A tuyere valve 9 is arranged midway on the inclined tuyere 6 to prevent the adverse flow of gas produced in the furnace. When blowing the oxidizing agent into the furnace, this valve is opened and when the blowing is finished it is closed.

*Examples*

In order to demonstrate the workability of the present method, a series of experiments were carried out in a blast furnace with a capacity of 5.0 m.³, having a hearth diameter of 2,000 mm. with the tuyere arrangement as illustrated in FIGURE 1.

At first, the experiments were carried out by smelting the charge containing iron sand ore in a large amount in the above mentioned blast furnace according to the conventional operating method in order to clarify the troubles caused by mixing iron sand ore into the charge in a large amount. Table 1 shows the results of the operations when using ordinary iron ores alone and using the charge containing 50% by weight of iron sand ore and 50% by weight of ordinary iron ores under the same conditions for the sake of comparison, in which Experiment No. 1 shows the result of using ordinary ores alone and Examples Nos. 2 to 4 the results of using 50% by weight of iron sand ore. The kinds of iron ores used in the ex- TABLE 1.—RESULTS OF OPERATIONS OF BLAST FURNACE ACCORDING TO THE CONVENTIONAL METHOD

| Experiment No. | Date | Rate of mixing iron sand ore, percent by wt. | Amount of charge of $TiO_2$ per ton of pig iron [kg./ton (metric)] | Amount of tapping in kg./d. | Coke ratio in kg./ton of pig iron | Composition of pig iron in percent | | | | |
|---|---|---|---|---|---|---|---|---|---|---|
| | | | | | | C | Si | S | Mn | Ti |
| 1 | 7/27–7/29 | 0 | 4.6 | 83,900 | 667 | 4.21 | 0.67 | 0.036 | 1.15 | 0.044 |
| 2 | 8/1 | 50 | 73.2 | 70,430 | 813 | 3.95 | 0.37 | 0.044 | 0.97 | 0.203 |
| 3 | 8/2 | 50 | 76.2 | 54,490 | 952 | 4.58 | 0.76 | 0.034 | 1.14 | 0.356 |
| 4 | 8/3 | 50 | 72.5 | 56,010 | 915 | 4.14 | 0.41 | 0.046 | 0.98 | 0.238 |

| Experiment No. | Date | Composition of slag in percent | | | Blast | | Oxide blown in— | | Hanging (frequency) | Slip (frequency) | Moisture in blast |
|---|---|---|---|---|---|---|---|---|---|---|---|
| | | CaO | $SiO_2$ | $TiO_2$ | Amount in m.³/min. | Pressure in g./cm.² | (Ore), kg./day | ($O_2$) | | | |
| 1 | 7/27–7/29 | 45.91 | 32.96 | 0.78 | 124 | 423 | 0 | 0 | 0 | 0 | 27.5 |
| 2 | 8/1 | 34.58 | 24.46 | 16.30 | 124 | 436 | 0 | 0 | 1 | 10 | 27.5 |
| 3 | 8/2 | 35.24 | 28.02 | 11.55 | 124 | 471 | 0 | 0 | 1 | 12 | 27.5 |
| 4 | 8/3 | 32.69 | 28.20 | 13.00 | 124 | 555 | 0 | 0 | 7 | 14 | 27.5 | periments and the mixing ratios thereof are as shown in Table 2.

TABLE 2.—KINDS AND MIXING RATIOS OF ORES USED IN THE OPERATION ACCORDING TO THE CONVENTIONAL METHOD

| Experiment No. | Mixing ratio of iron sand ore, percent | Mixing ratios of various iron ores | | | |
|---|---|---|---|---|---|
| | | Tambun iron ore, percent | Temangan iron ore, percent | Ordinary sintered ore, percent | Sintered iron sand ore, percent |
| 1 | 0 | 20 | 18 | 62 | 0 |
| 2-4 | 50 | 14 | 20 | 13 | 53 |

Remarks.—Sintered iron sand ore consists of 89.4% by weight of iron sand, 0.9% by weight of powdered manganese ore and 9.7% by weight of limestone. Mixing ratio of 50% by weight of iron sand ore is calculated by deducting flux from said sintered iron sand ore. Tambun ore is the iron ore produced in the Tambun district of Malaya. Temangan is the iron ore produced in the Temangan district of Malaya.

As seen in Table 1, the blast pressure increased gradually through Experiments Nos. 2, 3 and 4 until hanging occurred and the charge fed in through the furnace top no longer dropped down in a favorable manner. Further the molten pig iron became sticky and a large amount of molten pig iron flowed out through the slag notch, mixing with the slag, and the fluidity of the slag deteriorated. A half molten slag deposited on the forward end of the tuyere and prevented the ventilation. Further in comparing the iron contained in the raw material fed into the furnace with the iron coming out of the furnace, it was found that considerable iron remained in the furnace as shown in Table 3. The ratio of coke to the amount of tapped pig iron was also not favorable. The cause of these troubles is presumed to be that a coagulation of the iron especially high in titanium content remained in the furnace as a deposit on the furnace wall in the bosh and hearth and reduced the capacity of the furnace.

TABLE 3.—AMOUNT OF IRON REMAINING IN THE FURNACE IN THE OPERATION ACCORDING TO THE CONVENTIONAL METHOD

| Experiment No. | Iron fed into the furnace in kg. | Iron coming out of the furnace in kg. | Iron remaining in the furnace in kg. |
|---|---|---|---|
| 2 | 75,860 | 65,600 | 10,260 |
| 3 | 68,830 | 50,600 | 18,230 |
| 4 | 58,860 | 52,000 | 6,860 |

Next the experiments comprised blowing an oxidizing agent to oxidize and remove the coagulation deposited on the furnace wall and the furnace bottom while operating the furnace with the charge containing iron sand ore in a large amount.

TABLE 4.—RESULTS OF OPERATIONS OF BLAST FURNACE BY BLOWING OXIDIZING AGENTS ACCORDING TO THE CONVENTIONAL METHOD AND THE METHOD OF THE PRESENT INVENTION

| Experiment No. | Date, August | Rate of mixing iron sand ore | Amount of charge of $TiO_2$ per ton of pig iron [kg./ton (metric)] | Amount of tapping in kg./d. percent by wt. | Coke ratio in kg./ton o pig iron | Composition of pig iron in percent | | | | |
|---|---|---|---|---|---|---|---|---|---|---|
| | | | | | | C | Si | S | Mn | Ti |
| 1 | 10 | 30 | 42.4 | 58,768 | 888 | 3.76 | 0.64 | 0.057 | 1.42 | 0.138 |
| 2 | 11 | 30 | 46.0 | 52,742 | 797 | 3.92 | 0.58 | 0.048 | 1.75 | 0.155 |
| 3 | 12 | 30 | 62.4 | 53,364 | 820 | 4.04 | 0.47 | 0.042 | 2.01 | 0.160 |
| 4 | 13 | 30 | 61.6 | 56,350 | 867 | 3.97 | 0.54 | 0.035 | 1.91 | 0.158 |
| 5 | 14 | 30 | 61.7 | 53,148 | 879 | 3.97 | 0.69 | 0.047 | 2.09 | 0.138 |
| 6 | 15 | 30 | 60.4 | 62,994 | 788 | 3.79 | 0.55 | 0.049 | 1.90 | 0.142 |
| 7 | 16 | 30 | 61.1 | 60,519 | 732 | 3.96 | 0.52 | 0.043 | 1.94 | 0.154 |
| 8 | 17 | 30 | 61.7 | 62,980 | 783 | 3.93 | 0.52 | 0.040 | 2.01 | 0.158 |
| 9 | 18 | 30-50 | 92.7 | 66,934 | 747 | 3.84 | 0.53 | 0.044 | 1.96 | 0.157 |
| 10 | 19 | 50 | 92.5 | 58,739 | 916 | 3.93 | 0.52 | 0.045 | 1.93 | 0.210 |
| 11 | 20 | 50 | 87.5 | 53,474 | 915 | 3.64 | 0.52 | 0.045 | 1.77 | 0.160 |
| 12 | 21 | 50 | 86.6 | 58,924 | 802 | 3.62 | 0.51 | 0.051 | 1.71 | 0.125 |
| 13 | 22 | 50 | 86.3 | 60,241 | 806 | 3.73 | 0.50 | 0.046 | 1.82 | 0.132 |
| 14 | 23 | 50 | 86.2 | 63,430 | 780 | 3.77 | 0.46 | 0.048 | 1.86 | 0.131 |
| 15 | 24 | 50 | 86.0 | 72,322 | 751 | 3.70 | 0.49 | 0.050 | 1.84 | 0.146 |
| 16 | 25 | 50 | 86.0 | 74,146 | 726 | 3.77 | 0.49 | 0.043 | 1.87 | 0.170 |
| 17 | 26 | 50 | 86.2 | 73,053 | 751 | 3.86 | 0.49 | 0.044 | 1.85 | 0.184 |
| 18 | 27 | 50 | 89.6 | 73,354 | 762 | 3.79 | 0.49 | 0.044 | 1.84 | 0.174 |
| 19 | 28 | 50 | 87.2 | 73,340 | 760 | 3.73 | 0.54 | 0.049 | 1.75 | 0.163 |
| 20 | 29 | 50 | 86.1 | 70,376 | 765 | 3.68 | 0.50 | 0.048 | 1.77 | 0.129 |
| 21 | 30 | 50 | 86.4 | 59,582 | 804 | 3.74 | 0.48 | 0.041 | 2.25 | 0.138 |

TABLE 4.—Continued

| Experiment No. | Date, August | Composition of slag in percent | | | Blast | | Oxide blown in kg./day | | Hanging (frequency) | Slip (frequency) | Moisture in blast |
|---|---|---|---|---|---|---|---|---|---|---|---|
| | | CaO | SiO₂ | TiO₂ | Amount in m.³/min. | Pressure in g./cm.² | Ore | O₂ | | | |
| 1 | 10 | 32.91 | 29.68 | 13.0 | 120 | 387 | 0 | 126 | 0 | 4 | 34.7 |
| 2 | 11 | 32.98 | 29.50 | 12.0 | 120 | 402 | 0 | 99 | 0 | 8 | 32.2 |
| 3 | 12 | 32.18 | 28.64 | 13.2 | 120 | 462 | 0 | 48 | 3 | 11 | 31.0 |
| 4 | 13 | 30.42 | 29.63 | 12.3 | 120 | 471 | 350 | 96 | 7 | 20 | 29.4 |
| 5 | 14 | 30.84 | 30.52 | 11.3 | 120 | 404 | 490 | 0 | 0 | 6 | 34.0 |
| 6 | 15 | 31.02 | 30.24 | 12.3 | 120–121 | 362 | 750 | 0 | 0 | 4 | 33.7 |
| 7 | 16 | 31.02 | 30.40 | 12.3 | 121–122 | 352 | 810 | 0 | 0 | 4 | 33.0 |
| 8 | 17 | 30.87 | 31.49 | 12.0 | 122–123 | 363 | 720 | 0 | 0 | 7 | 31.9 |
| 9 | 18 | 30.72 | 31.08 | 12.7 | 123 | 363 | 960 | 0 | 0 | 7 | 30.3 |
| 10 | 19 | 29.20 | 28.39 | 15.5 | 123 | 358 | 1,020 | 0 | 0 | 2 | 29.8 |
| 11 | 20 | 27.62 | 30.04 | 16.1 | 123–124 | 333 | 930 | 0 | 0 | 7 | 34.7 |
| 12 | 21 | 27.04 | 28.79 | 16.9 | 124–125 | 320 | 1,230 | 0 | 0 | 4 | 35.0 |
| 13 | 22 | 27.18 | 29.24 | 16.7 | 125–128 | 328 | 1,080 | 0 | 0 | 2 | 35.0 |
| 14 | 23 | 29.00 | 28.75 | 16.15 | 128–130 | 353 | 1,080 | 0 | 0 | 4 | 35.0 |
| 15 | 24 | 28.94 | 28.37 | 16.43 | 130–131 | 365 | 1,080 | 0 | 0 | 3 | 34.0 |
| 16 | 25 | 28.93 | 27.53 | 16.55 | 131 | 349 | 1,200 | 0 | 0 | 4 | 33.0 |
| 17 | 26 | 29.94 | 26.02 | 16.50 | 131–133 | 353 | 1,290 | 0 | 0 | 3 | 31.9 |
| 18 | 27 | 30.17 | 27.49 | 16.35 | 133 | 379 | 1,260 | 0 | 0 | 4 | 27.5 |
| 19 | 28 | 28.63 | 26.98 | 16.70 | 133 | 400 | 1,290 | 0 | 0 | 4 | 27.5 |
| 20 | 29 | 26.74 | 28.63 | 17.00 | 126 | 354 | (¹) | 0 | 0 | 3 | 35.0 |
| 21 | 30 | 29.08 | 28.55 | 16.33 | 129 | 359 | (²) | 0 | 0 | 4 | 34.5 |

¹ Converter sludge.
² Manganese ore.

Table 4 shows the results of a large number of experiments (Experiments Nos. 1 to 21) carried out continuously day after day by blowing various kinds of oxidizing agents according to the conventional method and the method of the present invention. In these experiments the following iron ores were used as raw materials as shown in Table 5.

was that the blast pressure rose from 387 g./cm.² on the first day (Experiment No. 1) to 471 g./cm.² on the fourth day (Experiment No. 4), resulting in the occurrence of hangings (three times in the third day and 7 times in the fourth day) and slips (11 times on the third day and 20 times on the fourth day). It was presumed to occur because the coagulation was deposited above the tuyere and TABLE 5.—KINDS AND MIXING RATIOS OF IRON ORES USED IN THE EXPERIMENTS OF BLOWING OXIDIZING AGENTS

| Experiment No. | Date | Mixing ratio of iron sand ore, percent by wt. | Mixing ratios of various iron ores | | | |
|---|---|---|---|---|---|---|
| | | | Itabirite iron ore | Temangan iron ore | Ordinary sintered ore | Sintered iron sand ore |
| 1–8 | Aug. 10 to Aug. 17 | 30 | 49 | 20 | 0 | 31 |
| 9–21 | Aug. 18 to Aug. 30 | 50 | 48 | 0 | 0 | 52 |

Remarks.—Sintered iron sand ore consists of 89.4% by weight of iron sand ore, 0.9% by weight of powdered manganese ore and 9.4% by weight of limestone. 30% and 50% of mixing ratio of iron sand ore are calculated by deducting flux from sintered iron sand ore. Itabirite ore is the iron ore produced in Itabira of Brazil.

The chemical composition of iron ores used in the experiments are as shown in Table 6.

interfered with ventilation due to the increase in the blast pressure. This indicated that a gaseous oxidizing agent

TABLE 6.—CHEMICAL COMPOSITIONS OF IRON ORES USED IN THE EXPERIMENTS

| Kinds | Chemical compositions in wt. percent | | | | | |
|---|---|---|---|---|---|---|
| | Total Fe | SiO₂ | CaO, percent by wt. | Al₂O₃ | S | TiO₂ |
| Ordinary sintered ore | 53.74 | 7.78 | 10.65 | 2.53 | 0.034 | 0.34 |
| Tambun iron ore | 63.39 | 0.52 | 0.21 | 0.69 | 0.008 | 0.04 |
| Itabirite iron ore | 63.85 | 0.52 | 0.14 | 0.56 | 0.0050 | 0.05 |
| Sintered iron sand ore | 52.54 | 5.46 | 6.02 | 2.47 | 0.018 | 8.04 |
| Limestone | 0.09 | 0.48 | 55.33 | 0.07 | 0.011 | (¹) |

¹ Trace.

Among Experiments Nos. 1 to 21 as shown in Table 4, Experiments Nos. 1 to 3 are those in which a gaseous oxidizing agent alone was blown into the molten iron according to the conventional method, whereas in Experiments Nos. 5 to 21 a powdered solid oxidizing agent was blown by means of a high pressure air into the hearth according to the method of the present invention. In Experiments Nos. 1 to 3 a charge containing 30% by weight of iron sand ore was used and 12 to 15 m.³ of oxygen and 24 to 30 m.³ of air were blown into the molten iron in the furnace before tapping. In these experiments of blowing a gaseous oxidizing agent alone unfavorable results have been obtained as seen in Table 4 (Nos. 1 to 3). A remarkable phenomenon to be recognized from this table alone was not effective to oxidize the coagulation deposited on the furnace wall, even though oxygen was used as an oxidizing agent.

One of the reasons for the unfavorable results was that an oxidizing agent was blown immediately into the molten pig iron in the furnace.

The operation of the furnace according to the method of the present invention of blowing a powdered solid oxidizing agent in place of a gaseous agent into the hearth was commenced from the fourth day (Experiment No. 4), on which day unfavorable phenomena were the greatest as a result of the accumulation from unfavorable operations for more than three days as above mentioned, up to the 21st day (Experiment No. 21). In Experiment No. 4 a powdered iron ore was added to oxygen gas as an oxidizing agent, in Experiments Nos. 5 to 19 a powdered iron ore alone was used, whereas in Experiment No. 20 a converter sludge alone was used and in Experiment No. 21 a powdered manganese ore.

It is also possible to blow two kinds of powdered solid oxidizing agents selected from a group consisting of powdered iron ore, converter sludge, open-hearth sludge and powdered manganese ore.

The chemical compositions of the powdered solid oxidizing agents used are as shown in Table 7.

TABLE 7.—CHEMICAL COMPOSITIONS OF POWDERED SOLID OXIDIZING AGENTS

| Kinds | Chemical compositions in wt. percent | | | | | | | | | |
|---|---|---|---|---|---|---|---|---|---|---|
| | Total Fe | FeO | $SiO_2$ | $Al_2O_3$ | CaO | S | Crystal water | $TiO_2$ | Mn | P |
| Powdered iron ore | 68.84 | 1.50 | 0.79 | 0.32 | 0.06 | 0.009 | | 0.02 | 0.06 | 0.033 |
| Powdered manganese ore | 21.30 | | 8.11 | 5.26 | 0.73 | 0.024 | 10.0 | 0 | 29.56 | 9.192 |
| Converter sludge | 64.20 | | 1.58 | 1.64 | 2.20 | 0.672 | | | | |

In Experiments Nos. 4 to 8 a charge containing 30% by weight of iron sand ore was used, whereas in Experiments Nos. 9 to 21 a charge containing 50% by weight of iron sand ore was used.

The blowing conditions for the powdered solid oxidizing agents were as follows: In the experiments using the charge containing 30% by weight of iron sand ore 70 to 90 kg. of powdered iron ore mixed with high pressure air were blown and in the experiments using 50% by weight of iron sand ore 90 to 120 kg. of powdered iron ore mixed with high pressure air were blown in. When a converter sludge was used, 100 kg. thereof were blown and when a powdered manganese ore was used, 70 kg. thereof were blown. As to a high pressure air used as a medium when blowing powdered solid oxidizing agents the air used was 32 m.³/min. at a pressure of 2.95 kg./cm.² when blowing powdered iron ore, and 48.2 m.³/min. at a pressure of 2.95 kg./cm.² when blowing a converter sludge, and 32 m.³/min. at a pressure of 2.96 kg./cm.² in the case of powdered manganese ore.

The iron ore was blown through the inclined tuyere at a point 1600 mm. away from the forward end thereof and substantially at the level of the slag notch immediately after tapping of molten pig iron. A converter sludge and powdered manganese ore were blown immediately after tapping of the slag under the same conditions. The time used for blowing the powdered iron ore was 4 minutes, for blowing the converter sludge 6 minutes and for blowing the powdered manganese ore 4 minutes.

As is evident from Table 4, the blast pressure quickly dropped to a level lower than in the ordinary operating conditions. This was particularly noteworthy in Experiments Nos. 4 and 5, in which the blast pressure of 471 g./cm.² in the former dropped down to 404 g./cm.² in the latter due to a quick effect produced by adding a powdered iron ore to oxygen gas as an oxidizing agent. Thus the furnace condition became favorable and no trouble occurred at all. The ratio of coke to the amount of tapped pig iron also gradually became favorable. The cause of this is thought to be that the coagulation deposited above the tuyere in the furnace which would otherwise interfere with ventilation was oxidized and removed by blowing in the powdered iron ore.

It was also found to be effective to blow powdered iron ore into the intermediate zone between the molten pig iron layer and the level of the tuyere at any time before tapping instead of blowing it in just after tapping.

When iron ore was blown into the furnace after tapping, the coagulation deposited on the furnace wall was oxidized and, at the same time, a part of the titanium and silicon in the molten pig iron which fell to the hearth was oxidized and removed, because the powdered iron ore blown into the hearth stayed in the hearth to oxidize the molten pig iron which fell from above.

The aforesaid experiments have been carried out on the charges containing 30 to 50% by weight of iron sand ore.

However, the method of the present invention is not limited to the iron sand ore contents of 30% and 50%. It may be also applied to the operation of the furnace with the charge containing 100% iron sand ore.

What we claim is:

1. A method of operating a blast furnace for producing pig iron in a blast furnace comprising charging the furnace with a charge having at least 30% high titaniferrous content iron sand ores, blowing at least one powdery solid oxidizing agent selected from the group consisting of powdered iron ore, converter sludge, open-hearth sludge and powdered manganese ore with a high pressure gaseous medium into the furnace at a point in the zone constituted by the bosh and hearth above any pool of molten metal and slag which is present therein.

2. A method claimed in claim 1, wherein at least two powdered solid oxidizing agents selected from a group consisting of powdered iron ore, converter sludge, open-hearth sludge and powdered manganese ore are blown into the furnace.

3. A method claimed in claim 1, wherein the charge contains from about 30 to 50% by weight of iron sand ore for producing pig iron.

References Cited

UNITED STATES PATENTS

| | | | |
|---|---|---|---|
| 914,830 | 3/1909 | Harper | 75—41 |
| 943,599 | 12/1909 | Hubbard | 75—41 |
| 2,149,480 | 3/1939 | Paschke | 75—41 |
| 2,814,558 | 11/1957 | Halversen | 75—41 |
| 2,833,643 | 5/1958 | Newman | 75—41 |
| 2,938,782 | 5/1960 | Toulmin | 75—41 |

DAVID L. RECK, *Primary Examiner.*

H. W. TARRING, *Assistant Examiner.*